United States Patent [19]
Callies et al.

[11] 3,819,347
[45] June 25, 1974

[54] TEMPERATURE REGULATION OF MOLTEN GLASS

[75] Inventors: Gerald A. Callies, Toledo, Ohio; Frank W. Irland, Ottawa, Ill.; Russell C. Retzloff, Maumee, Ohio; James T. Zellers, Charleston, W. Va.

[73] Assignee: Libbey-Owens-Ford Company, Toledo, Ohio

[22] Filed: July 31, 1972

[21] Appl. No.: 276,654

[52] U.S. Cl................ 65/29, 65/95, 65/204, 65/162
[51] Int. Cl............................. C03b 15/04
[58] Field of Search....... 65/95, 203, 204, 161, 162, 65/136, 29

[56] References Cited
UNITED STATES PATENTS

| | | | |
|---|---|---|---|
| 2,116,450 | 5/1938 | Richardson et al. | 65/162 X |
| 3,457,059 | 7/1969 | Boettner | 65/136 X |
| 3,508,899 | 4/1972 | Ward | 65/95 X |
| 3,658,503 | 4/1972 | Prislan | 65/136 X |
| 3,694,181 | 9/1972 | Dear | 65/162 X |

*Primary Examiner*—Arthur D. Kellogg
*Attorney, Agent, or Firm*—Collins & Oberlin

[57] ABSTRACT

Method and apparatus for controlling the thickness of vertically drawn sheet glass. A scanning pyrometer periodically observes the temperature of the glass in a series of zones across the drawing area at the meniscus through which the sheet is drawn. A muffle having a plurality of corresponding temperature control zones extends transversely above the stream of molten glass flowing into the drawing area. The temperature of the glass flowing beneath each zone of the muffle is individually regulated in response to the observed temperature in a corresponding zone at the meniscus to thereby deliver to the drawing area glass at a predetermined temperature which will produce a sheet of the desired uniform thickness.

17 Claims, 10 Drawing Figures

TEMPERATURE REGULATION OF MOLTEN GLASS

BACKGROUND OF THE INVENTION

1. Field of the Invention

The present invention pertains broadly to thickness control in the production of vertically drawn sheet glass, and more particularly to regulating the temperature of the molten glass from which the sheet is drawn to produce a temperature profile therein across the drawing area which will yield a sheet of a uniform desired thickness. While the invention will be illustrated and described herein in connection with the so-called Colburn process of producing sheet glass, to which it is particularly well adapted, it will be understood that it is adapted to other sheet glass drawing techniques, and indeed to control of the temperature of molten glass in place and float glass production as well. Thus, the invention can be utilized with any flowing body of molten glass.

2. Description of the Prior Art

In producing sheet glass, a continuous glass ribbon is drawn upwardly from a mass of molten glass maintained within a working receptacle or draw pot. Molten glass, properly conditioned for drawing as it flows successively through the melting, refining and cooling chambers of a continuous tank furnace, is continuously supplied to the working receptacle to replace that drawn into the ribbon. As the glass is drawn upwardly from the molten mass through a meniscus into ribbon form, it continues to stretch or attenuate until it has cooled sufficiently to set in its final sheet form. The ultimate thickness of the sheet is dependent upon a number of factors including the viscosity of the molten glass and the speed of draw. Viscosity, of course, is closely related to the temperature of the molten glass. Thus, it is necessary that the glass be at the proper temperature as it is drawn into the meniscus if a sheet of the uniform desired thickness across its width is to be produced.

Heretofore, various measures have been proposed for controlling the temperature of the molten glass flowing into the sheet forming zone. For example, U.S. Pat. No. 3,414,397, issued Dec. 3, 1968 to James T. Zellers, Jr., suggests the use of tubular muffles over the molten glass stream with internal heating and/or cooling devices for thermally conditioning the glass. However these devices, while they have provided a measure of control over molten glass temperature and hence sheet thickness, have not entirely solved the problem in that they do not provide precise control in localized areas entirely across the drawing area. They generally involve human judgment of one form or another as where the operator observes the upwardly rising sheet and adjusts the position of coolers or heaters inserted through the ends of the muffles to correct the temperature in areas of the sheet he believes to be outside acceptable thickness tolerances. Thus, both the thickness of the sheet and the amount of temperature control applied to the molten glass are matters of human judgment. An actual thickness measurement is not made until the sheet has progressed some distance through the annealing lehr, or even has reached the capping area at the end of the lehr. Due to the length of time required for the sheet to reach the point where its thickness can be accurately measured, an extensive amount of defective glass may have already been produced by the time a serious thickness discrepancy is detected in this manner. Even if such a discrepancy were detected, the corrective measures heretofore taken of manipulating heaters or coolers lacked precision, so that it was virtually impossible to arrive at and maintain the correct thickness entirely across the sheet.

SUMMARY OF THE INVENTION

In accordance with the invention, a ribbon of glass is continuously drawn upwardly from a bath of molten glass and deflected about a bending member into a substantially horizontal plane for passage through an annealing lehr. A pyrometer is mounted about the sheet forming area to periodically scan across the meniscus through which the sheet is drawn and determine the temperature of the glass in each of a plurality of zones extending across the meniscus.

A hollow muffle is positioned transversely above the stream of molten glass entering the drawing area immediately preceding the meniscus. The muffle is divided into a plurality of zones across the glass stream corresponding to the zones of the meniscus whose temperature is measured by the scanning pyrometer. During the preceding flow from the melting furnace into the drawing area, the molten glass is conditioned so that as it arrives at the meniscus its temperature will be at or above that necessary for producing the desired thickness entirely across the sheet. As the pyrometer scans across the meniscus and determines the temperature in each zone thereof, mechanism is automatically activated to blow cooling air against the lower wall of the muffle in any zones corresponding to zones of the meniscus within which the temperature is above that producing the desired thickness in the sheet. Heat is thus radiated from the glass to the muffle in those zones, and the glass flowing beneath the muffle is lowered in temperature as necessary to create a desired temperature profile across the meniscus which will yield a sheet of uniform thickness. As the temperature in a particular zone of the meniscus is lowered to the desired level, this factor is detected by the scanning pyrometer and the flow of cooling fluid to the corresponding zone of the muffle is reduced or discontinued.

A primary object of the invention is to consistently produce drawn window or sheet glass of uniform thickness across the width of the sheet.

Another object of the invention is to automatically maintain the molten glass across the meniscus in a sheet glass drawing operation at a predetermined temperature profile which will produce a sheet of uniform thickness across its width.

Another object of the invention is, in the drawing of sheet glass, to regulate the temperature of the molten glass flowing into the zone of sheet information in response to the actual temperature of the glass in the meniscus through which the sheet is drawn.

Other objects and advantages of the invention will become more apparent during the course of the following description, when taken in connection with the accompanying drawings.

BRIEF DESCRIPTION OF THE DRAWINGS

In the drawings, wherein like numerals are employed to designate like parts throughout the same.

DESCRIPTION OF THE PREFERRED EMBODIMENTS

Figure 1:
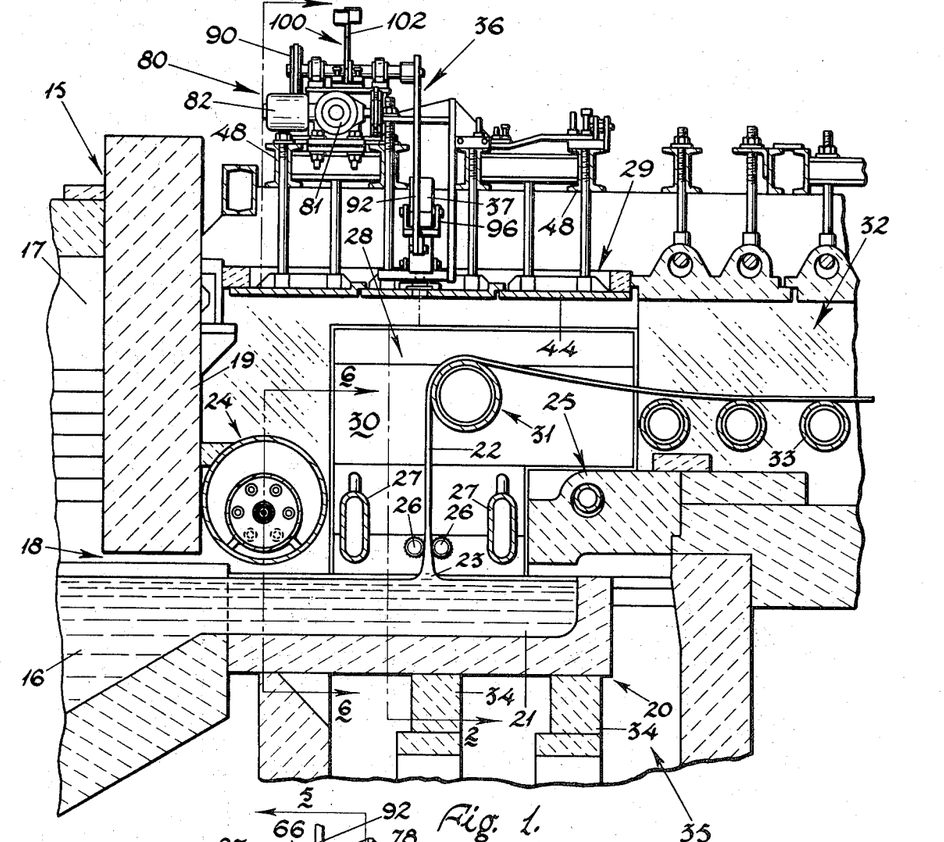
FIG. 1 is a longitudinal vertical section through the forming area of a sheet glass furnace embodying the invention.

Referring now to the drawings, and in particular to FIG. 1 thereof, there is shown generally at 15 the outlet end of the cooling chamber of a continuous tank furnace of any conventional or preferred construction in which a mass of molten glass is continuously produced, refined and cooled to proper working temperature. The molten glass, indicated at 16, flows from a cooling chamber 17 of the furnace through an opening 18 beneath a cooling chamber end wall 19 into a working receptacle or draw pot 20 to form a relatively shallow pool of molten glass 21 from which a sheet or ribbon 22 is continuously drawn upwardly. As the glass is drawn upwardly from the molten pool it creates a meniscus 23 at the surface, and then gradually attenuates thereabove until finally set as the sheet 22. A front muffle lip tile 24, which also serves to control the temperature of the incoming molten glass as will be hereinafter described, and a rear lip tile 25 located over the molten glass at the entrance and rear, respectively of the working receptacle, create a quiescent zone over the molten glass through which the sheet is drawn during its formative stage.

Pairs of knurled rolls 26 conventionally engage the sheet along either marginal edge to establish and maintain it at the proper width, and coolers 27 are located opposite either surface in the usual fashion to absorb heat from the sheet by radiation as it is drawn upwardly. The sheet 22 rises vertically from a short distance within the drawing chamber, designated generally at 28 and comprising the end wall 19, a roof 29 and opposite side walls 30, and is then deflected about a bending member 31 for passage through an adjacent annealing lehr 32 on a series of aligned lehr or machine rolls 33. Since the invention is concerned with the actual sheet forming area, only that portion of the furnace necessary for a proper understanding of the invention has been shown and described.

Heretofore in the production of sheet glass, the molten glass was conditioned prior to and within the cooling chamber 17 so as to supposedly arrive at the zone of sheet formation of the proper temperature for drawing. The draw pot 20 rests upon pot stools 34 within a pot chamber 35, and heat is provided within this pot chamber as by gas fired burners or electric heating elements (not shown) to maintain the molten glass at the drawing temperature. As pointed out above, various measures have heretofore been taken to control the temperature across the stream of glass entering the sheet forming zone. However, such measures were generally based upon factors such as the thickness of the glass at the capping area, visual observation of the upwardly rising sheet in the drawing chamber, and the knowledge that the stream of glass has a natural tendency to cool more rapidly at the edges due to heat loss through the side walls of the furnace.

The temperature of the glass at the meniscus is a critical factor in determining the configuration which the sheet will ultimately have, since the attenuation of the glass as it is drawn upwardly therefrom until set in final sheet form is a function of glass temperature. In order to produce a sheet of uniform thickness across its width, the glass temperature across the meniscus must maintain the proper temperature in order to produce a sheet free from thickness variations. To this end, in accordance with the present invention, a temperature sensing device indicated generally at 36 in FIG. 1, is mounted above the roof 29 of the drawing chamber to periodically scan the meniscus and determine the temperature profile thereacross. As will be hereinafter more fully explained, the observed temperatures are then employed in controlling the muffle 24 to regulate the temperature of the glass flowing into the meniscus.

The temperature sensing device 36, as best illustrated in FIGS. 2 through 5, includes a radiation pyrometer 37 of a type suitable for determining the temperature of glass in the range encountered in sheet glass drawing. One such pyrometer is the Honeywell Class 93 High Speed Pyrometer made by the Minneapolis Honeywell Company of Minneapolis, Minnesota. The pyrometer is pivotally supported above the roof 29 on legs 38 having bearing pins 39 received in wye blocks 40 carried by a base plate 41. The base plate has a central opening 42 therein aligned with an elongated opening 43 in a roof plate 44 of the drawing chamber roof 29. A plate 45 of high temperature glass closes the opening 43 to maintain the enclosed atmosphere of the drawing chamber while providing a window through whifh the pyrometer 37 can scan the meniscus 23.

The base plate 41 is affixed at one edge to a carrier plate 46 depending from a mounting frame, illustrated generally at 47, carried by cross braces 48 of the furnace superstructure. The other edge of the plate 41 is supported by a pair of threaded adjusting rods 49 as will be hereinafter explained.

In order to permit the pyrometer 37 to be properly aimed at the base of the meniscus, the mounting frame 47 is provided with universal adjustment features, that is, features by which it can be adjusted vertically, longitudinally and transversely as well as tilted. To this end, there is attached to one of the cross braces 48 a mounting pad 50 while the cross brace adjacent the pyrometer has affixed thereto an adjusting block 51. An adjusting plate 52 rests upon the pad 50 and block 51 and is provided with a longitudinally extending slot 53 over the pad 50 and a pair of such slots 54 over the block 51. A threaded stud 55 affixed to the pad 50 extends through the slot 53 and is provided with a nut and lockwasher combination 56 for clamping the adjusting plate 52 in position. The end of the plate 52 can be raised relative to the pad 50 by means of a leveling bolt 57 threaded through the plate 52 and bearing against the pad. A nut and lockwasher combination 58 holds the leveling bolt in the selected position. In order to provide longitudinal adjustment of the plate 52 as permitted by the slots 53 and 54, a tab 59 is provided on the end thereof. A lug 60 is fastened to the mounting pad 50 by a capscrew 61 extending through a slot therein (not shown) so that it can be moved up and down with the end of the adjusting plate 52. An adjusting screw 62 is oppositely threaded into the tab 59 and leg 60 so that upon turning thereof the tab, and hence the adjusting plate 52, will be moved longitudinally toward or away from the lug.

Figure 3:
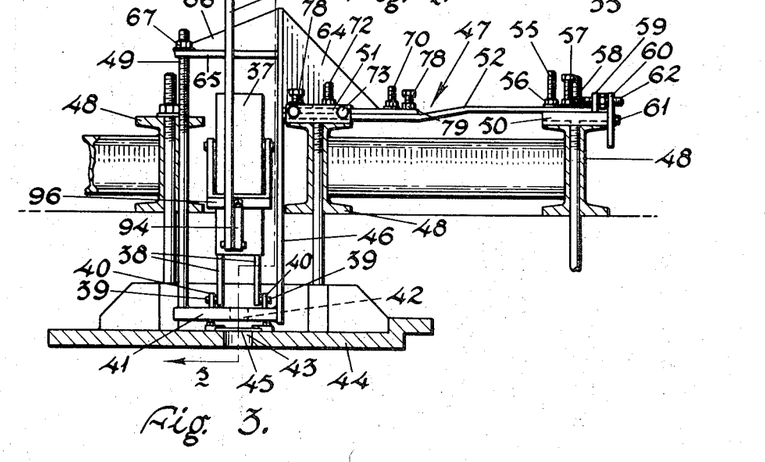
FIG. 3 is an enlarged fragmentary view of the pyrometer of the scanner mechanism illustrated in FIG. 1.
Figure 4:
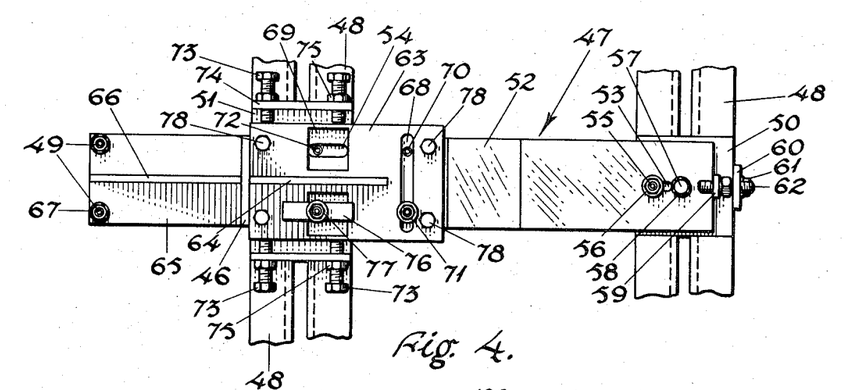
FIG. 4 is a plan view of the bracket for mounting the pyrometer.

As best shown in FIGS. 3 and 4, the pyrometer is actually carried by a support plate 63 resting upon the adjusting plate 52 and affixed to the carrier plate 46 as by welding. In order that the assembly will be rigid to prevent vibration during operation, the carrier plate extends above the support plate and a strengthening rib 64 is secured to the two members. A strut 65 extends from the opposite face of the carrier plate and a rib 66 is provided to strengthen and rigidify the connection. The adjusting rods 49 extend through openings in the strut and, with nut and washer combinations 67 thereon bearing against the upper surface of the strut, adjustably support the outer end of the base plate 41. Thus, by manipulation of the nuts 67 minor corrections which may sometimes be necessary can be made to compensate for displacement of the pyrometer 37 resulting from warping or distortion of the supporting framework due to the temperature to which it is subjected.

In order to provide transverse adjustment for the pyrometer, the support plate 63 is provided with an elongated slot 68 and a pair of enlarged openings 69 over the slots 54 in the adjusting plate 52. Studs 70 affixed to the adjusting plate 52 extend up through the slot 68, permitting the support plate 63 to be moved in one direction relative thereto, with nut and lockwasher combinations 71 threaded in the studs for clamping the adjusting and support plates together. Securing studs 72 affixed to the adjusting block 51 extend upwardly through the slots 54 in the adjusting plate 52 and enlarged openings 69 in the support plate 63. The slots 53 and 54 thus permit the entire assembly to be moved longitudinally by the adjusting screw 62, while the slot 68 and the openings 69 permit the support plate 63 to be moved transversely. The transverse movement of the support plate is effected by pairs of adjusting bolts 73 threaded through upstanding flanges 74 on the adjusting block 51 and bearing against the opposite edges of the support plate. Lock nuts 75 are provided on the adjusting bolts, and straps 76 on the securing studs 72 are drawn down against the support plate by nut and lockwasher combinations 77 to further secure the support plate in the selected position. Leveling capscrews 78 threaded through the support plate 63 and having lock nuts 79 thereon bear against the adjusting plate 63 and are used, in conjunction with the studs 70 and 72 and straps 76, to precisely position the pyrometer vertically and angularly with respect to the window 45 and meniscus 23.

It will thus be apparent that by means of the mounting frame 47 the radiation pyrometer can be accurately positioned and maintained to scan across the draw pot in the area of the meniscus as desired. It can be moved longitudinally of the furnace by loosening the nuts 71 and 77 and manipulating the adjusting bolts 73. The pyrometer may be tilted, raised or lowered by manipulating the leveling capscrews 78 in conjunction with the nuts 71 and straps 76. The end of the adjusting plate 52 may also be raised or lowered to tilt the plane in which the pyrometer oscillates by loosening the capscrew 61 and manipulating the nut 56 and leveling bolt 57.

Figure 2:
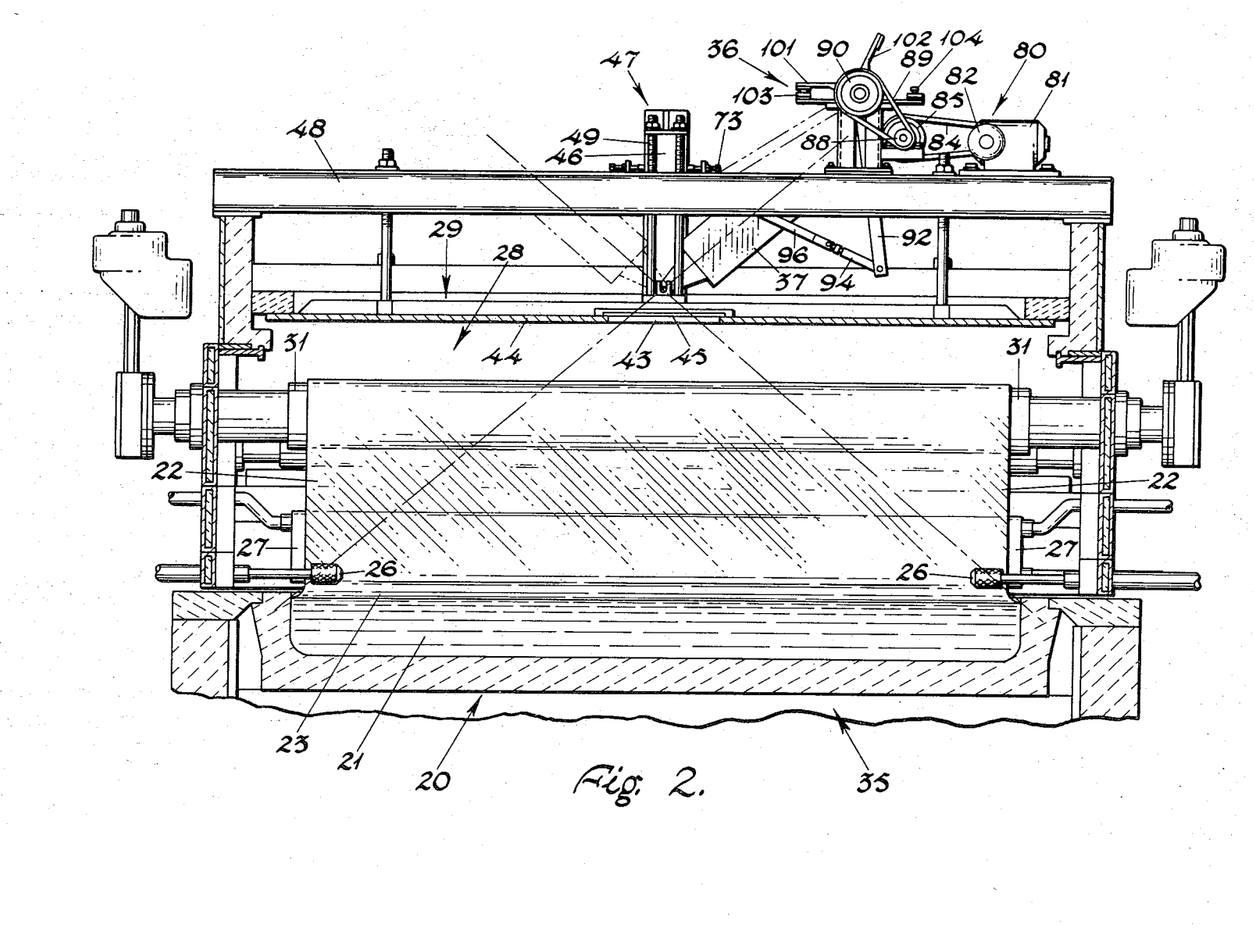
FIG. 2 is a transverse vertical section taken substantially along line 2—2 of FIG. 1.
Figure 5:
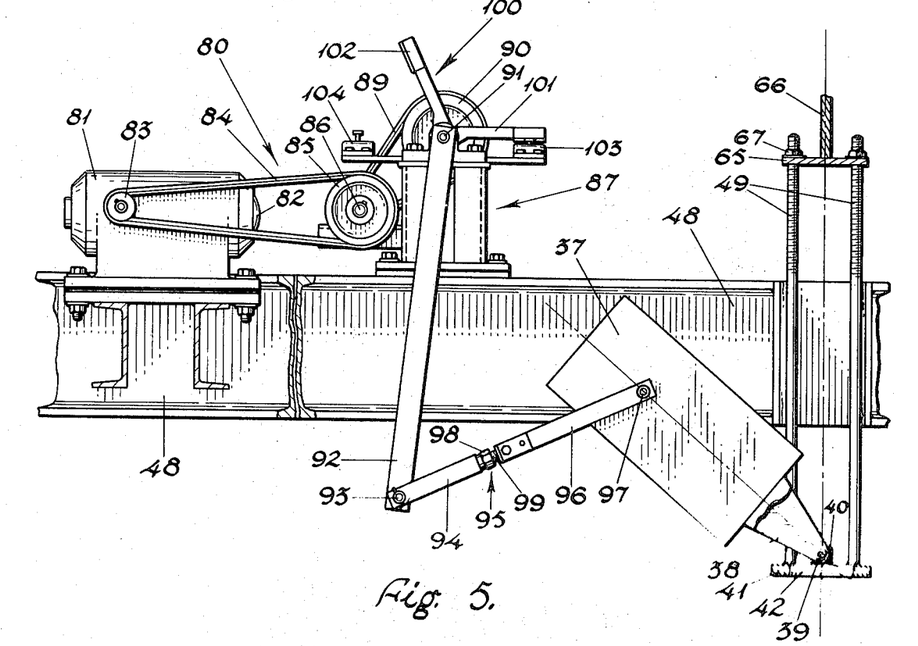
FIG. 5 is a fragmentary, enlarged, front elevational view of the scanner mechanism.

The pyrometer 37 is caused to rock back and forth between the full line and broken line positions illustrated in FIG. 2, so as to scan from side to side of the draw pot, by a drive mechanism 80 carried upon the superstructure of the furnace. As best shown in FIGS. 2 and 5, to this end there is provided a variable speed reduction unit 81 driven by a reversible motor 82. The reduction unit, by means of a drive pulley 83 and belt 84, drives a pulley 85 on a line shaft 86 carried by a frame 87. The line shaft, in turn, by means of a pulley 88 and belt 89, drives a pulley 90 affixed to one end of a crankshaft 91 on the frame 87. A crank arm 92 affixed to the other end of the crankshaft is pivotally connected at 93 to a link 94. By means of an adjustable coupler 95, the link is connected to a yoke 96 pivotally attached at 97 on either side of the pyrometer 37. The adjustable coupler 95 comprises a swivel nut 98 secured to the link 94 and a union 99 attached to the yoke and threaded into the swivel nut. Thus, by turning the swivel nut the link 94 can, in effect, be changed in length to vary the extreme positions between which the pyrometer oscillates.

In order to cause the pyrometer to reverse direction at the ends of its path as shown by the broken line and full line positions illustrated in FIG. 2, there is affixed to the crankshaft 91 a forked control lever 100 having a pair of switch actuating arms 101 and 102. Reversing limit switches 103 and 104 are mounted on the frame 87 so as to be actuated by the arms 101 and 102, respectively, at each extremity of the oscillatory path of the pyrometer. Thus, as the motor 82 drives the variable speed reduction unit in one direction it, in turn, rotates the crankshaft 91 to swing the crank arm 92 and pivot the pyrometer 37 in the wye blocks 40. At the same time the forked control lever 100 is being rotated. As the pyrometer reaches the limit of its travel in that direction, the switch actuating arm 101 or 102 engages its associated limit switch 103 or 104 to reverse the motor 82 and start the crankshaft rotating in the opposite direction. Should the motor fail to reverse for any reason, the limit switches with associated safety switches, as will be hereinafter described, may also serve to disconnect it from the line voltage upon further depression by the switch actuating arms.

By means of the variable speed reduction unit 81, the rate at which the pyrometer 37 scans the meniscus can be varied. A period of about 1 minute for movement in each direction has been found suitable in most instances. Likewise, in a practical application it has ben found that the entire width of the draw pot can be scanned as illustrated in FIG. 2, by swinging the pyrometer through an arc of about 98°, this being accomplished by rotating the crankshaft 91 through about 65° between activation of the limit switches 103 and 104. With the temperature sensing device mounted in position, the adjustable coupler 95 can be manipulated to center the arc in which the pyrometer 37 swings so that it will scan from one side of the draw pot to the other as shown in FIG. 2.

Control of the temperature of the incoming molten glass in response to observed temperature deviations at the meniscus is exercised through the front muffle lip tile 24 extending across the glass stream at the entrance to the draw pot. As explained previously, the desired temperature profile in the sheet forming zone can generally be achieved by selectively cooling the glass in a plurality of individual segments or zones across the width of the molten glass stream, and the invention is shown and described herein in that context. Nevertheless, it is well within the contemplation of the invention that in certain instances it may be desirable to heat the glass in any or all of these zones to achieve the desired temperature profile, and for this purpose conventional heating means such as gas fired burners or electrical resistance heating elements may also be provided in the individual zones.

Figures 6, 7, 8, 9:
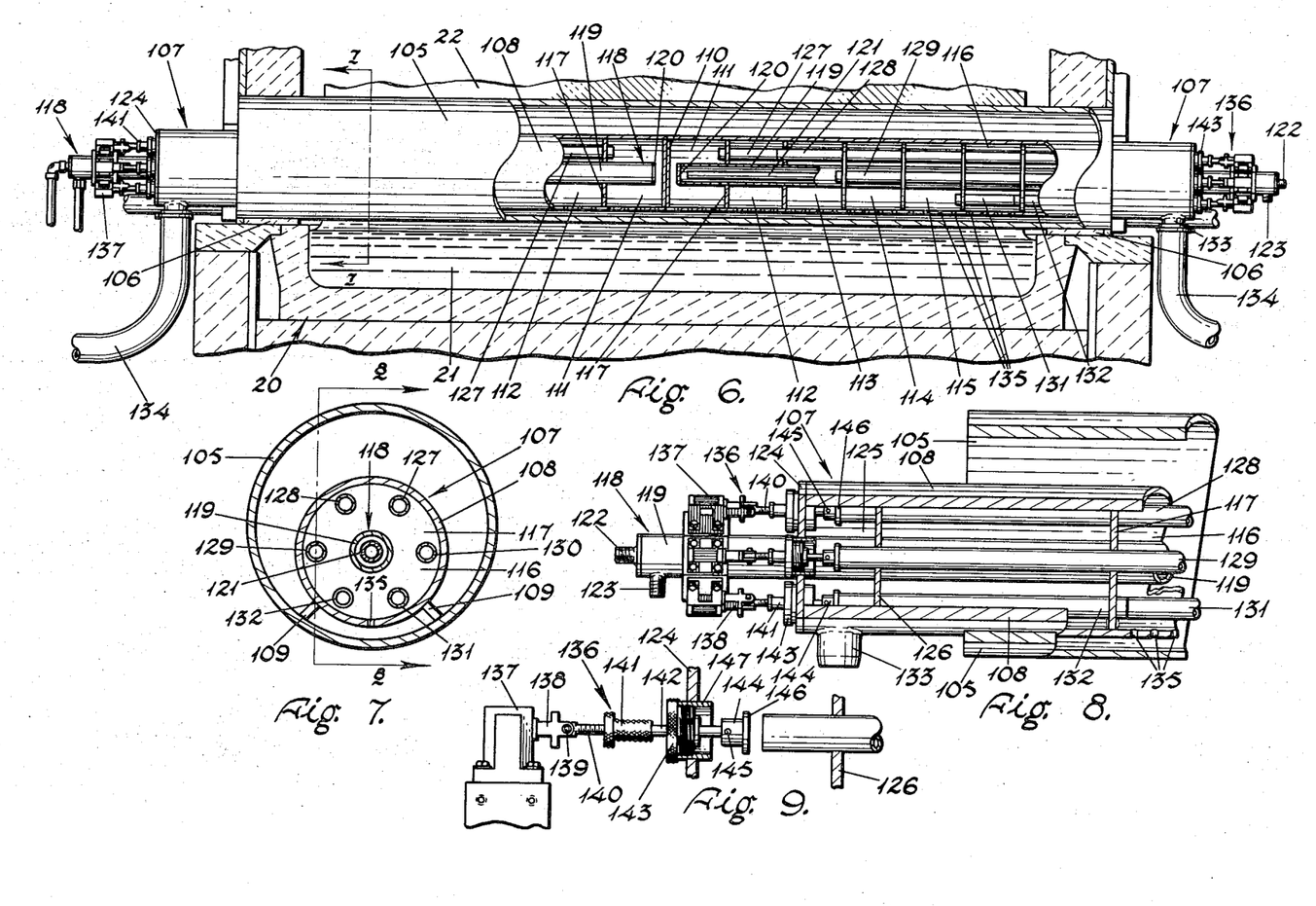
FIG. 6 is a fragmentary, enlarged, elevational view of the muffle, with parts broken away.
FIG. 7 is a transverse section through the muffle taken substantially along line 7—7 of FIG. 6.
FIG. 8 is a fragmentary longitudinal section through the muffle taken substantially along line 8—8 of FIG. 7.
FIG. 9 is an enlarged fragmentary view, partially in section, of one of the valve mechanisms illustrated in FIG. 8.

As best shown in FIGS. 6 to 9, the muffle lip tile 24 comprises a tubular member 105 extending across the draw pot and resting on blocks 106 on the side walls of the draw pot 20 and surrounding pot chamber 35. The tubular member is positioned closely adjacent the surface of the glass and is formed of a heat conducting material, generally a metal such as stainless steel, which will withstand the temperatures encountered. Inserted within each open end of the tubular member 105 is a thermal regulating device 107. The thermal regulators are substantially identical in design and meet at the center of the tubular member 105 as shown in FIG. 6 so as to provide interrupted temperature control across the draw pot.

The regulating devices include a cylindrical body member 108 of somewhat smaller diameter than the tubular member 105, having affixed to its outer surface a plurality of spaced individual legs 109 upon which it is supported within the tubular member. The tubular member 105 may have an inside diameter on the order of 14 inches and the cylindrical body member 108 a diameter of 8 inches, for example. The cylindrical body member is closed at the inner end by a plate 110 and its interior is divided into a series of regulating zones or compartments 111, 112, 113, 114, 115, and 116 separated by circular dividers 117 welded in place around their periphery so that the compartments are airtight. The number of regulating zones into which the thermal regulating device 107 is divided will depend upon a number of factors such as the width of the draw pot and the width of the band of molten glass beneath the muffle lip tile which it is necessary to thermally treat in order to produce the desired temperature profile at the meniscus. It has been found that in standard window glass machines of the Colburn type, adequate control can be maintained with a series of twelve to sixteen such zones. Thus, in the embodiment of FIG. 6 each regulating device 107 is divided into six regulating zones.

In order to cool the interior of the lip tile and maintain it at a safe operating temperature, a counterflow cooler 118 is provided along the longitudinal axis of the cylindrical body member 108. A tube 119 of the cooler extends through each of the circular dividers 117 and terminates with a closed end 120 within the regulating compartment 111. A tubular member 121 is mounted concentrically within and spaced from the tube 119 with its open end short of the closed end 120. The tubular member 121 is connected to a source of heat absorbing fluid through a coupling 122, and a coupling 123 is provided in the wall of the tube 119 for discharging the spent fluid. Thus, heat absorbing fluid flows through the tube 121, through the space between the tubular member 121 and the tube 119, and is discharged through the coupling 123.

As best shown in FIG. 8, the outer end of the cylindrical body member 108 is closed by a manifold plate 124. An enclosed plenum chamber 125 is formed in the end section of the body member by a plate 126 similar to the circular dividers 117. Manifold pipes 127 through 132, spaced around the cylindrical body member 108, extend through the plate 126 at one end with their open end terminating within the plenum chamber 125. At their opposite end each of the manifold pipes terminates within one of the regulating zones or compartments 111 to 116, respectively. Provision is thus made for each of the regulating compartments to separately communicate with the plenum chamber 125. By means of a fitting 133 in the wall of the body member 108 and a conduit 134, the plenum chamber 125 is connected to a suitable source of air under pressure. A series of perforations 135 is provided in the wall of the body member 108 facing the bottom of the tubular member 105 within each of the regulating zones 111 to 116. Thus, cooling air flows from the plenum chamber 125 through the manifold pipes into the individual regulating zones 111 to 116, and is discharged through the perforations 135 against the wall of the body member 108. It cools the particular area of the wall against which it impinges, and is then discharged through the open end of the tubular member 105. The corresponding segment of the molten glass radiates heat to the relatively cooler portion of the muffle lip tile thereabove.

By selectively regulating the amount of cooling air which is allowed to enter the ends of the manifold pipes 127 to 132 within the plenum chamber, the amount by which the molten glass is cooled in any zone can be controlled so as to produce the desired temperature profile across the glass. Air at atmospheric tempeature is normally supplied to the plenum chamber 125 at a pressure of about four pounds per square inch for cooling purposes. Air flow to the regulating zones 111 to 116 is controlled by individual valve mechanisms 136 operating in conjunction with the open ends of the manifold pipes 127 to 132 within the plenum chamber as best shown in FIG. 9. While the thermal regulating device is adapted for automatic control by the temperature sensing device 36, manual control by an operator observing the formation of the sheet may also be desirable at certain times as when a malfunction occurs in the sensing device. A skilled operator can detect thickness variations across the sheet surprisingly well by observation, and by manually operating the thermal regulating device can control the temperature across the glass stream much more accurately than was possible with prior art devices.

To this end, each valve mechanism 136 comprises a soleniod 137 mounted around the cooler 118 and actuated through suitable control mechanism, as will be hereinafter described by the radiation pyrometer 37. The armature 138 of the solenoid is pivotally connected at 139 to a coupler 140 threaded into a knurled thumbscrew 141. A connecting rod 142 affixed at one end to the knurled thumbscrew slideably extends through a collar 143 into the plenum chamber 125 and has a cap 144 pivotally attached at 145 to its other end.

A circular valve plate 146 on the cap is adapted, upon advancement of the connecting rod 142, to restrict and finally shut off the flow of air from the plenum chamber into the manifold pipe as it closes against the end thereof. The collar 143 is removably received within a sleeve 147 in the manifold plate 124 as by screwthreads, so that the entire valve assembly 136 can be removed for repair or replacement as necessary. The sleeve 147 is suitably sealed around the connecting rod 142 as by packing (not shown) so that air does not leak from the plenum chamber.

The solenoid 137, when not energized, advances the valve plate 146 toward the closed position against the end of the manifold pipe as shown in FIG. 8. The position of the valve plate with the solenoid not energized, as well as the maximum distance by which the plate is spaced from the manifold pipe when the connecting rod 142 is retracted by the armature 138 of the solenoid, can be controlled by rotating the knurled thumbscrew 141 to move it along the threaded coupler 140. In manual operation the valve may also be manipulated in this manner. Thus, with the solenoids de-energized, the valve plates are urged toward the closed position. The operator may then rotate the thumbscrews to open or close valves and regulate the cooling of the glass as necessary to correct any thickness deviations in the ribbon detected either visually in the sheet forming zone or by measurement in or at the end of the annealing lehr.

Figure 10:
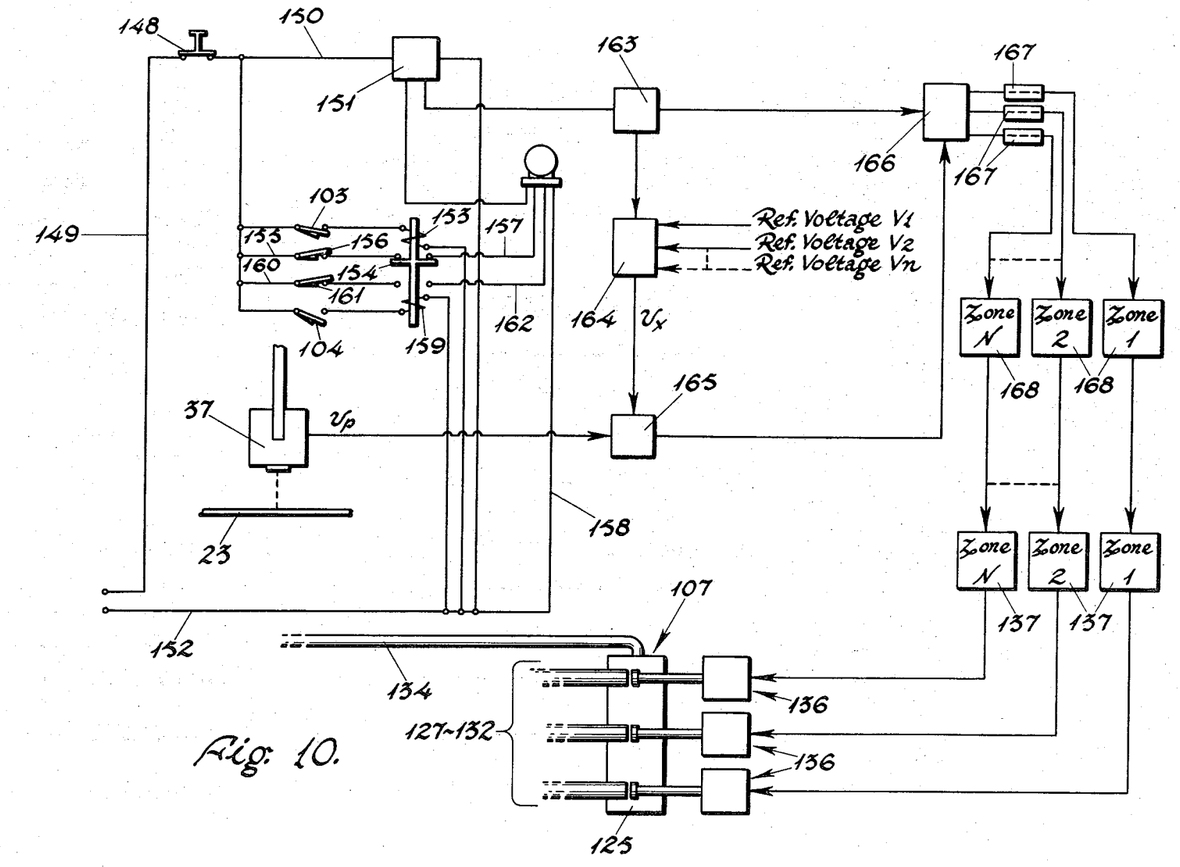
FIG. 10 is a diagrammatic view illustrating one form of controls for operation of the system.

There is shown in FIG. 10, one form of suitable control mechanism, utilizing conventional components for operating the device. Thus, in order to initiate operation, a start switch 148 is manually closed to complete a circuit from one side 149 of a power supply through a line 150 and a system timer 151 to the other side 152 of the power supply. Simultaneously, a circuit is completed from the line 150 through the closed reversing limit switch 103 and the solenoid 153 of a double acting solenoid switch 154 to the line 152. The solenoid 153 closes the switch 154 to complete a circuit from the line 150 through a line 155, a normally closed safety switch 156 associated with the limit switch 103, the solenoid switch 154, a line 157, the reversible pyrometer drive motor 82, and a line 158 to the line 152. Thus, upon a signal from the system timer 151 the pyrometer drive motor 82 starts, driving the reduction unit 81 and ultimately the crank shaft 91 having affixed thereto the forked control lever 100 and the crank arm 92 which swings the pyrometer 37 (FIG. 5).

The control lever 100 rotates with the crankshaft 91 and, as the pyrometer reaches the extremity of its oscillatory path, switch actuating arm 102 engages and closes the reversing limit switch 104. The limit switch 103, which has remained closed during movement of the control lever from the opposite extremity, is simultaneously opened. A circuit is thus completed from line 150 through the reversing switch 104 and a solenoid 159 to the other side 152 of the power supply. Energization of the solenoid 159 with simultaneous de-energization of the solenoid 153 closes the switch 154 in the opposite direction to complete a circuit from the line 150 through a line 160, a safety switch 161, the double acting solenoid switch 154, a line 162, the drive motor 82 and the line 158 to the other side 152 of the power supply, thereby starting the reversible pyrometer drive motor in the opposite direction. The sequence is then reversed at the opposite end of the path, with the limit switch 103 being closed and the double acting switch 154 thrown to the opposite poles so as to again reverse the pyrometer drive motor.

Should the reversing mechanism malfunction for any reason and the control lever 100 continue past its normal reverse point, the actuating arms 101 or 102 will open the appropriate safety switch 156 or 161 associated with the reversing switches 103 and 104, respectively, to shut off the drive motor. In order to again start the motor, this switch must be manually reset. It will thus be seen that the radiation pyrometer 37 will be caused to oscillate back and forth so as to repeatedly scan across the glass body.

As hereinabove described, the thermal regulating devices 107 within the tubular member 105 are divided into any suitable number of zones or compartments which will permit maintenance of the desired temperature profile in the glass across the working receptacle or draw pot. In order to synchronize the pyrometer with the zones of the thermal regulating device as it scans across the meniscus, the timer 151 activates a zone advance initiator 161 which advances the control mechanism to successive zones of the regulating device as the pyrometer observes corresponding successive zones of the meniscus.

A predetermined described temperature is established for each zone, and this temperature is translated into a reference voltage for this zone and stored for comparison with the voltage corresponding to the temperature observed by the pyrometer in the zone. The zone advance initiator 163 thus controls a reference selection switch 164 which selects the reference voltage $V_1$, $V_2$, through $V_n$, (n being the number of zones across the pool by glass) for each succeeding zone scanned by the pyrometer. This reference voltage, illustrated as $V_r$, is then directed to a voltage comparator 165. The pyrometer 37 observes the actual temperature of the glass in the same zone and translates this observed temperature to a pyrometer voltage $V_p$ which is a function of the temperature. The voltage $V_p$ is impressed upon the comparator 165 which compares it with the reference voltage $V_r$. Based upon the relative magnitude of the two voltages, if the observed glass temperature in the zone is above the desired temperature for that zone, the voltage comparator sends a signal to a zone memory select switch 166 which, in turn, directs the signal to the proper zone of the thermal regulating devices 107. To this end the zone memory select switch is also controlled by the zone advance initiator 163 so that as the pyrometer advances through successive zones, the memory select switch is correspondingly advanced to direct signals to the proper zone control mechanism.

The zone memory select switch 166 directs the signal through an auto/manual switch 167 in each zone circuit to an on/off memory device 168. It is normally necessary for the pyrometer to read the temperature in only one direction in its cycle, and the full cycle may cover a period of about 2 minutes, so that some time will elapse between subsequent signals to each zone. The on/off memory devices serve to retain the valve control solenoids 137 and associated valve mechanisms 136 in a particular position from one scanning cycle to the next. In other words, should the pyrometer observe an excessive glass temperature in a zone, the voltage comparator will signal the valve control solenoid for that zone, through the zone memory select switch 164, auto/manual switch 165 and on/off memory device 166, to open the valve mechanism 136 and blow cooling air into the corresponding zone of the thermal regulating device 107. The on/off memory device will then retain the valve control solenoid in the open position until the pyrometer has gone through a full cycle and again observed the glass temperature in that zone and sent an appropriate signal to the solenoid. Likewise, if on one cycle a valve control solenoid is in closed position, it will be retained in closed position by the on/off memory device until completion of the next cycle by the pyrometer.

Through the auto/manual switches 165 for each zone, the valve control solenoids and valve mechanisms may be manually controlled independently of the pyrometer should it be desired to do so. Thus, by manipulating the auto/manual switches, the valves to any zones may be opened or closed independently of pyrometer operation to provide the aforementioned manual operation. Of course, manual operation may also be accomplished by manipulation of the knurled thumbscrews 141 by above described, or the valve mechanism 136 may be removed by unscrewing the collar 143 from the sleeve 147 and inserting a suitable hand operated valve mechanism (not shown).

It is to be understood that the form of the invention herewith shown and described is to be taken as an illustrative embodiment only of the same, and that various changes in the shape, size and arrangement of parts, as well as various procedural changes, may be resorted to without departing from the spirit of the invention.

We claim:

1. In a method of controlling the temperature across a flowing body of molten glass to provide a predetermined temperature profile across the glass body at a selected location and wherein a glass sheet is continuously drawn upwardly from said body of molten glass substantially at said selected location, the improvement comprising the steps of periodically scanning across the flowing glass body at said location and determining the actual temperature of the glass in each of a plurality of first zones extending end-to-end across said glass body, said first zones in which the actual temperature is determined being at the base of the meniscus through which said sheet is drawn from said glass body, and thermally conditioning the molten glass in each of a plurality of second zones corresponding to said first zones in advance of said location in response to said actual temperatures in said first-named zones, whereby the flowing body of molten glass has said predetermined temperature profile at said location.

2. A method of controlling the temperature across a flowing glass body as claimed in claim 1, in which said molten glass is thermally conditioned by selectively cooling said glass in said second zones.

3. A method of controlling the temperature across a flowing glass body as claimed in claim 1, in which said molten glass is thermally conditioned by radiating heat from said second zones to a relatively cooler body located thereabove.

4. A method of controlling the temperature across a flowing glass body as claimed in claim 3, including maintaining a temperature profile across said cooler body to which heat is radiated from each of said second zones adequate to remove heat from said molten glass of each said second zone at a rate whereby said flowing body of glass has said predetermined temperature profile at said selected location.

5. A method of controlling the temperature across a flowing glass body as claimed in claim 1, including the steps of establishing a desired temperature for the molten glass in each said first zone, translating said desired temperature to a reference voltage for each said first zone and storing said reference voltages, observing the actual temperature of the molten glass in each said first zone and translating said actual temperature to a voltage, comparing the actual voltage to said stored reference voltage for each said first zone during each said periodic scan across said glass body, and thermally conditioning said molten glass in each said second zone in proportion to the difference between the actual voltage and the stored reference voltage for each said first zone.

6. In apparatus for producing a desired temperature profile at a selected location across a flowing body of molten glass including a working receptacle into which said body of molten glass flows and means for continuously drawing a sheet of glass upwardly through a meniscus from said molten glass substantially at said selected location, the improvement comprising temperature sensing means mounted above said body of glass, drive means for said temperature sensing means causing said sensing means to periodically scan across said glass body and determine the actual temperature in each of a plurality of first zones extending end-to-end across said body, said temperature sensing means being mounted and driven so as to scan across the base of said meniscus, thermal regulating means mounted above and extending across said flowing body of glass in advance of said selected location, said thermal regulating means being divided into a plurality of second heat exchange zones corresponding to said first zones, means comparing the observed actual temperature with the predetermined desired temperature for each of said first zones, and means regulating the exchange of heat between said molten glass and said second heat exchange zones in response to deviations of said actual temperatures from said desired temperatures for producing said desired temperature profile at said selected location.

7. Apparatus for producing a desired temperature profile across a flowing body of molten glass as claimed in claim 6, wherein said temperature sensing means comprises a pyrometer pivotally mounted above said body of glass, and said temperature comparing means includes means converting the actual temperature readings from said pyrometer to a proportional electrical voltage.

8. Apparatus for producing a desired temperature profile across a flowing body of molten glass as claimed in cliam 7, wherein said temperature comparing means includes means for comparing said electrical voltage from said actual temperature with a stored reference voltage indicative of the desired temperature for each said first zone.

9. Apparatus for producing a desired temperature profile across a flowing body of molten glass as claimed in claim 8, including means responsive to variations between said actual temperature electrical voltage and said stored reference voltage for regulating the supply of coolant to each said second heat exchange zones.

10. Apparatus for producing a desired temperature profile across a flowing body of molten glass as claimed in claim 6, wherein said thermal regulating means comprises a hollow muffle lip-tile having a heat conducting wall spaced closely above said flowing body of molten glass, and means within the interior of said lip tile for selectively directing cooling air against said heat conducting wall in individual segments thereof comprising said second heat exchange zones.

11. Apparatus for providing a desired temperature profile across a flowing body of molten glass as claimed in claim 6, wherein said thermal regulating means comprises a hollow muffle with a heat conducting wall facing said molten glass, temperature control means within said muffle comprising a tubular member divided into a plurality of individual compartments in end-to-end abutting relationship thereacross corresponding to said second zones, means communicating individually with each of said compartments for supplying a temperature control medium thereof, a plurality of openings in the bottom of each said compartment facing said heat conducting wall, and means regulating the flow of said temperature control medium through said communicating means to each said compartment.

12. Apparatus for producing a desired temperature profile across a flowing body of molten glass as claimed in claim 11, wherein said means communicating with each said compartment comprises a manifold pipe extending from each said compartment to a common plenum chamber for carrying air from said plenum chamber to said individual compartments, and means supplying cooling air under pressure to said plenum chamber.

13. Apparatus for producing a desired temperature profile across a flowing body of molten glass as claimed in claim 12, including individual valve means associated with each said manifold pipe regulating the flow of cooling air therethrough from said plenum chamber.

14. Apparatus for producing a desired temperature profile across a flowing body of molten glass as claimed in claim 13, including means operated by said means comparing the observed actual temperature with the predetermined desired temperature for controlling said valve means to regulate said flow of cooling air through said manifold pipes.

15. Apparatus for producing a desired temperature profile across a flowing body of molten glass as claimed in claim 6, wherein said temperature sensing means includes a pyrometer pivotally mounted above said body of glass, said temperature comparing means including means converting the actual temperature readings from said pyrometer to a proportional electrical voltage and means for comparing said electrical voltage from said actual temperature with a stored reference voltage indicative of the desired temperature for each said first zone, said thermal regulating means comprising a hollow muffle having a heat conducting wall facing said molten glass, a temperature control means within said muffle comprising a tubular member divided into a plurality of individual compartments in end-to-end abutting relationship thereacross corresponding to said second zones, a manifold pipe extending from each said compartment to a common plenum chamber for carrying air from said plenum chamber to said individual compartments for supplying a temperature control medium thereto, means supplying cooling air under pressure to said plenum chamber, a plurality of openings in the bottom of each said compartment facing said heat conducting wall, individual valve means associated with each said manifold pipe regulating the flow of cooling air therethrough from said plenum chamber, and means operated by said means comparing the observed actual temperature with the predetermined desired temperature for controlling said valve means to regulate said flow of cooling air through said manifold pipes.

16. In apparatus for producing a desired temperature profile at a selected location across a flowing body of molten glass, the improvement comprising temperature sensing means mounted above said body of glass, drive means for said temperature sensing means causing said sensing means to periodically scan across said glass body and determine the actual temperature in each of a plurality of first zones extending end-to-end across said body, thermal regulating means mounted above and extending across said flowing body of glass in advance of said selected location, said thermal regulating means comprising a hollow muffle lip-tile having a heat conducting wall spaced closely above said flowing body of molten glass, said lip-tile being divided into a plurality of second heat exchange zones corresponding to said first zones, means comparing the observed actual temperature with the predetermined desired temperature for each of said first zones, and means regulating the exchange of heat between said molten glass and said second heat exchange zones in response to deviations of said actual temperatures from said desired temperatures for producing said desired temperature profile at said selected location, said last-named means including means within the interior of said lip-tile for selectively directing cooling air against said heat conducting wall in individual segments thereof comprising said second heat exchange zones.

17. Apparatus for producing a desired temperature profile across a flowing body of molten glass as claimed in claim 16, wherein said means within the interior of said hollow muffle lip-tile comprises a tubular member divided into a plurality of individual compartments in end-to-end abutting relationship thereacross corresponding to said second zones, means communicating individually with each of said compartments for supplying a temperature control medium thereto, a plurality of openings in the bottom of each said compartment facing said heat conducting wall, and means regulating the flow of said temperature control medium through said communicating means to each said compartment.

* * * * *

PO-1050
(5/69)

UNITED STATES PATENT OFFICE
CERTIFICATE OF CORRECTION

Patent No. 3,819,347      Dated June 25, 1974

Inventor(s) Gerald A. Callies et al

It is certified that error appears in the above-identified patent and that said Letters Patent are hereby corrected as shown below:

Col. 2, line 13, "about" should be --above--; line 54, "information" should be --formation--.
Col. 3, line 51, "from" should be --for--; line 64, "of" (second occurrence) should be --at--.
Col. 4, line 44, "whifh" should be --which--.
Col. 6, line 57, "ben" should be --been--.
Col. 7, line 30, "interrupted" should be --uninterrupted--.
Col. 8, line 40, "tempeature" should be --temperature--.
Col. 10, line 26, "described" should be --desired--.
Col. 11, line 22, "by" should be --as--.
Col. 12, line 56, "cliam" should be --claim--.
Col. 13, line 18, "thereof" should be --thereto--.

Signed and sealed this 8th day of October 1974.

(SEAL)
Attest:

McCOY M. GIBSON JR.
Attesting Officer

C. MARSHALL DANN
Commissioner of Patents